United States Patent [19]

Cunningham et al.

[11] Patent Number: 5,311,777
[45] Date of Patent: May 17, 1994

[54] WHEEL BALANCER WITH ADJUSTABLE OPERATOR POD

[75] Inventors: Charles L. Cunningham, Nashville; Randy C. Hunt, Murfreesboro, both of Tenn.

[73] Assignee: Hennessy Technology Corporation, LaVergne, Tenn.

[21] Appl. No.: 952,916

[22] Filed: Sep. 28, 1992

[51] Int. Cl.⁵ ............................................. G01M 1/08
[52] U.S. Cl. ................................... 73/462; 73/866.3; 248/279; 248/904
[58] Field of Search ................. 73/462, 460, 471, 473, 73/475, 487, 866.3; 248/276, 279, 287, 904

[56] References Cited

U.S. PATENT DOCUMENTS

| | | | |
|---|---|---|---|
| 1,797,847 | 3/1931 | Vandagriff | 248/279 |
| 3,677,093 | 7/1972 | Hutchings | 73/473 |
| 4,410,158 | 10/1983 | Maffei | 248/279 |

OTHER PUBLICATIONS

Corghi EM89 Wheel Balancer (brocure of Corghi S.p.A.).
Hofmann Geodyna 100 Wheel Balancer (brocure of Hofmann S.p.A.).
MF MT6000 Wheel Balancer (brochure of Mondolfo ferro S.p.A.).

*Primary Examiner*—John E. Chapman
*Attorney, Agent, or Firm*—Mark J. Patterson; I. C. Waddey, Jr.; Edward D. Lanquist, Jr.

[57] ABSTRACT

The present invention discloses a wheel balancer having a floor standing base and an operator keyboard and display pod mounted to a support above the base. Manually adjustable brackets attaching the substantially L-shaped support to the base and to the pod allow the pod to be adjusted by the operator through four degrees of freedom, including into a space minimizing position for shipping or storage.

7 Claims, 8 Drawing Sheets

WHEEL BALANCER WITH ADJUSTABLE OPERATOR POD

BACKGROUND OF THE INVENTION

The present invention relates generally to motor vehicle wheel balancing equipment and more particularly to an operator keyboard and display pod on a wheel balancer which allows vertical, rotational, and horizontal adjustment of the pod.

It will be appreciated by those skilled in the art that automotive service equipment, such as a wheel balancing machine, usually includes a base unit which houses a motor drive assembly for rotating the wheel to be balanced, a power supply, and tool and weight tray. Such a machine will also have an operator interface which includes a keyboard or switch assembly for entering data and for controlling operations, as well as an electronic display which reflects information concerning the status and operation of the machine. In many prior art balancers, the operator keyboard/display is integral to the machine base and is not adjustable. In others, a physically separated "pod" is attached to and extends vertically above the base and which contains the keyboard, display, or both.

It will further be appreciated by those skilled in the art that the operator interface pod should be adjustable so that any sized machine operator can easily view the display and operate the keyboard from many different directions and under a variety of ambient lighting conditions.

A few attempts have been made in the prior art to provide adjustable pods on wheel balancers, with limited success. For example, the Corghi EM 89 Wheel Balancer has a pod which rotates and moves horizontally but cannot be moved vertically or tilted.

The Hoffman Geodyna 100 has a pod which extends from a support which can be tilted but can not be rotated or moved vertically or horizontally.

The MF MT 6000 pod sits on a support. The pod can be rotated about the support but can not be moved vertically, horizontally, or tilted.

The operator interfaces on the Coats Model 1004, Model 1001, Model 850, Model 600, and Model 6401 are fixed and cannot be tilted or rotated.

In addition to lacking complete adjustability, prior art wheel balancer pods have a further deficiency in the amount of space they take up during shipping and storage. Such pods either must be completely removed or an oversize container must be used to secure the pod which is fully or partially extended from the base unit.

What is needed, then, is an operator interface pod for a wheel balancer which allows the pod to slide, rotate, and pivot through multiple degrees of freedom. This interface pod must also be adjustable both horizontally as well as vertically, including into a position proximate to the base unit where it occupies minimal space during packing and shipping. This device is presently lacking in the prior art.

SUMMARY OF THE INVENTION

The present invention discloses a floor mounted wheel balancer base unit joined to an operator interface pod by a substantially L-shaped support having a horizontally oriented section joined at right angles to a vertically oriented section. The horizontal section is received by a bracket attached to the pod. The pod bracket allows the pod to rotate about, or tilt, and move longitudinally along the horizontal section of the support. A second bracket which is attached to the wheel balancer base receives the vertical section of the pod support. The base unit bracket allows the vertical section of the pod support to rotate as well as to move vertically. The frictional force supplied by the brackets to the support can be controlled by tightening or loosening of bolts, nuts, wing nuts, and the like.

Accordingly, one object of the present invention is to provide an operator interface pod attached to a wheel balancer base which allows the pod to move vertically and horizontally, to rotate with respect to the balancer base, and to tilt forward and backward in the vertical plane.

Still another object of the present invention is to provide an operator interface pod which can be easily moved proximate to the base such that the combination of pod and base occupies minimal volume during shipping or storage.

Still another object of the present invention is to provide a pod which can be adjusted about the wheel balancer to make it easily accessible to and viewable by an operator.

DESCRIPTION OF THE PREFERRED EMBODIMENT

Figure 1:
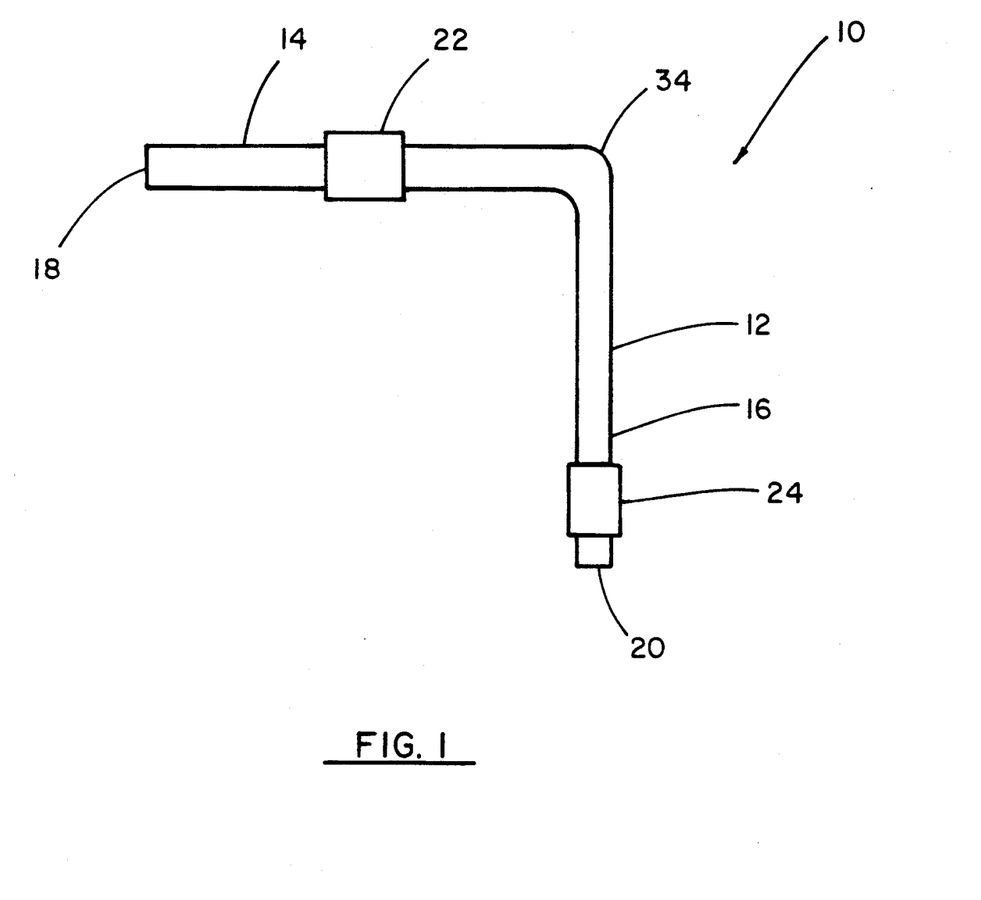
FIG. 1 is a side view of the pod support of the present invention.
Figure 2:
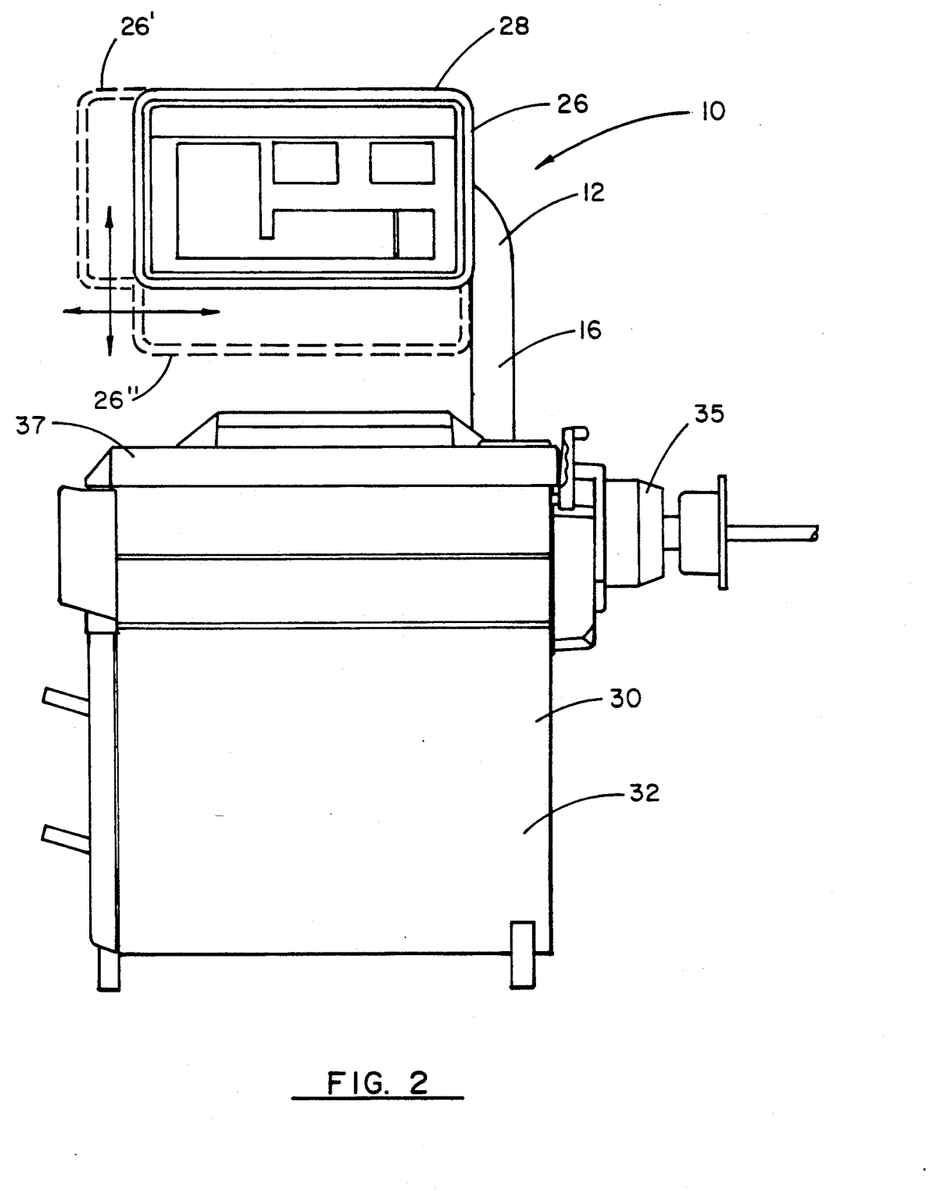
FIG. 2 is a front view of the pod mounted to a wheel balancer base, showing in phantom horizontal movement of the pod along the pod support as well as vertical movement of the pod by vertical adjustment of the support.

Referring now to FIGS. 1 and 2 there is shown generally at 10 the adjustable operator interface pod of the present invention. Device 10 includes pod support 12 having a horizontally oriented section 14 and vertically positioned section 16. Support 12 has first end 18 proximate to horizontal section 14 and second end 20 proximate to vertical section 16. Support 12 is, in the preferred embodiment, a piece of 2.5 inch O.D. pipe or tubing which has been bent such that horizontal section 14 extends at substantially ninety degrees (90°) from vertical section 16. However, support 12 can be made of any rigid or semi-rigid material, including plastic and the like. Further, instead of being bent, support 12 can actually be two separate pieces welded or otherwise fastened together at elbow 34. Pod support 12 attaches operator interface pod 26, which preferably includes both data entry and display elements, to wheel balancer base unit 30. Base unit 30 will conventionally include a wheel mounting and rotation hub assembly 35, a tool and weight tray 37, and a housing 32 which encloses a drive motor, imbalance force transducers, and related components (not shown).

As can be seen in FIG. 1, pod bracket 22 slidably and rotationally receives horizontal section 14 whereas base bracket 24 slidably and rotationally receives vertical section 16. In the preferred embodiment, pod bracket 22 is attached to pod 26 whereas base bracket 24 is attached to balancer base unit 30. Brackets 22 and 24 hold pod support 12 by frictional contact around the exterior surface of support 12. When adjustment is desired, a nut, bolt, wing nut, or other tensioning device is loosened to allow movement of support 12 with respect to brackets 22 or 24.

Referring now to FIGS. 1, 2, 7, and 8 in conjunction, one can see how device 10 works in connection with pod 26 and wheel balancer base 30. Pod 26 is enclosed by pod housing 28 whereas balancer base 30 has balancer base housing 32. As discussed above, pod bracket 20 is fixedly attached, in the preferred embodiment, to pod housing 28. Pod bracket 22 is loosened which allows bracket 22 to slide along horizontal section 14. This sliding allows pod 26 to move to the position of pod 26'. Similarly, as discussed above, base bracket 24 is fixedly attached to balancer housing 32 but slidably and rotationally attached to section 16. Loosening of bracket 24 allows vertical section 16 to move up and down and rotate in relation to base bracket 24. Loosening of base bracket 24 allows pod 26 to be moved to pod position 26''.

Figure 7:
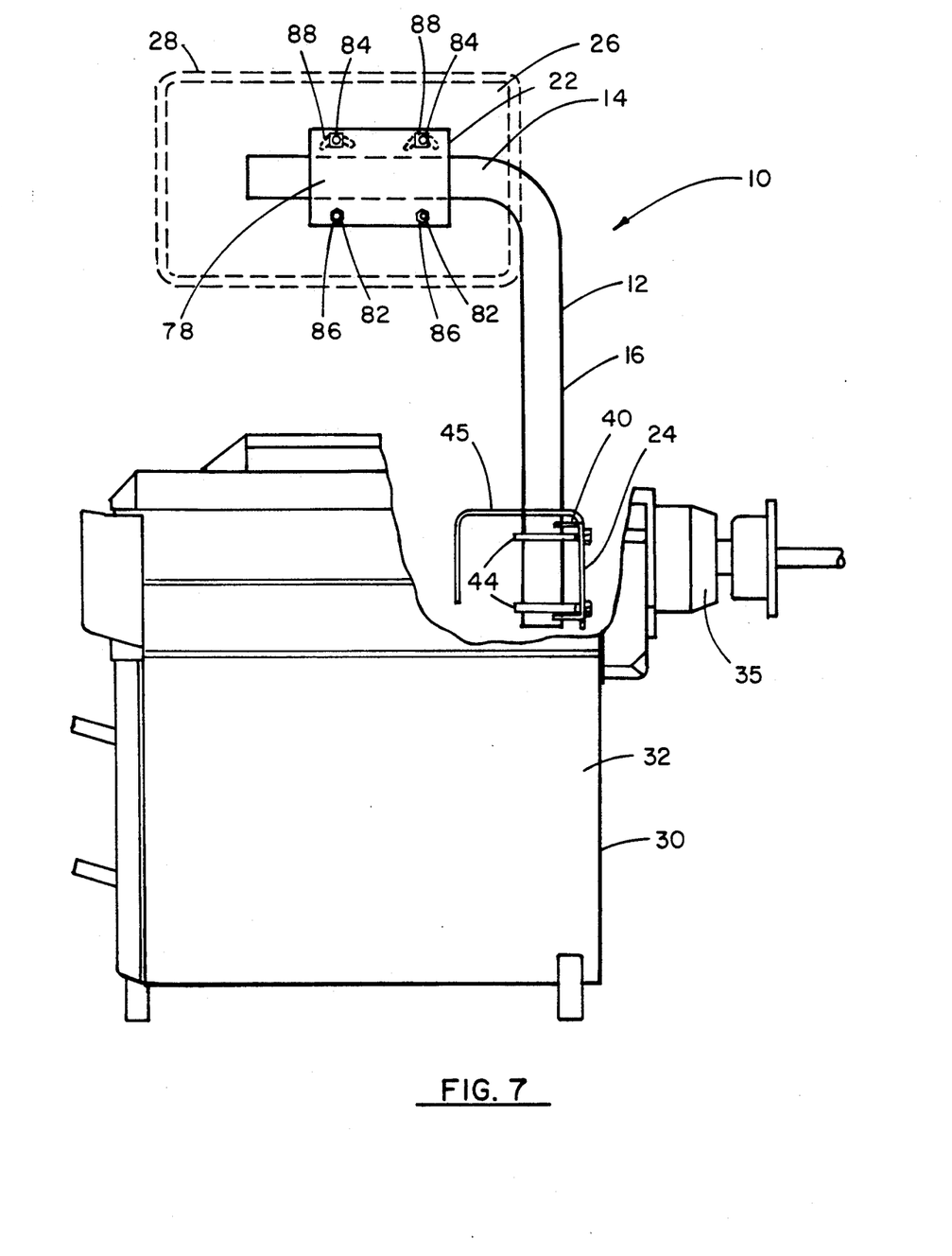
FIG. 7 is a cutaway front view of a preferred embodiment of the present invention.
Figure 8:
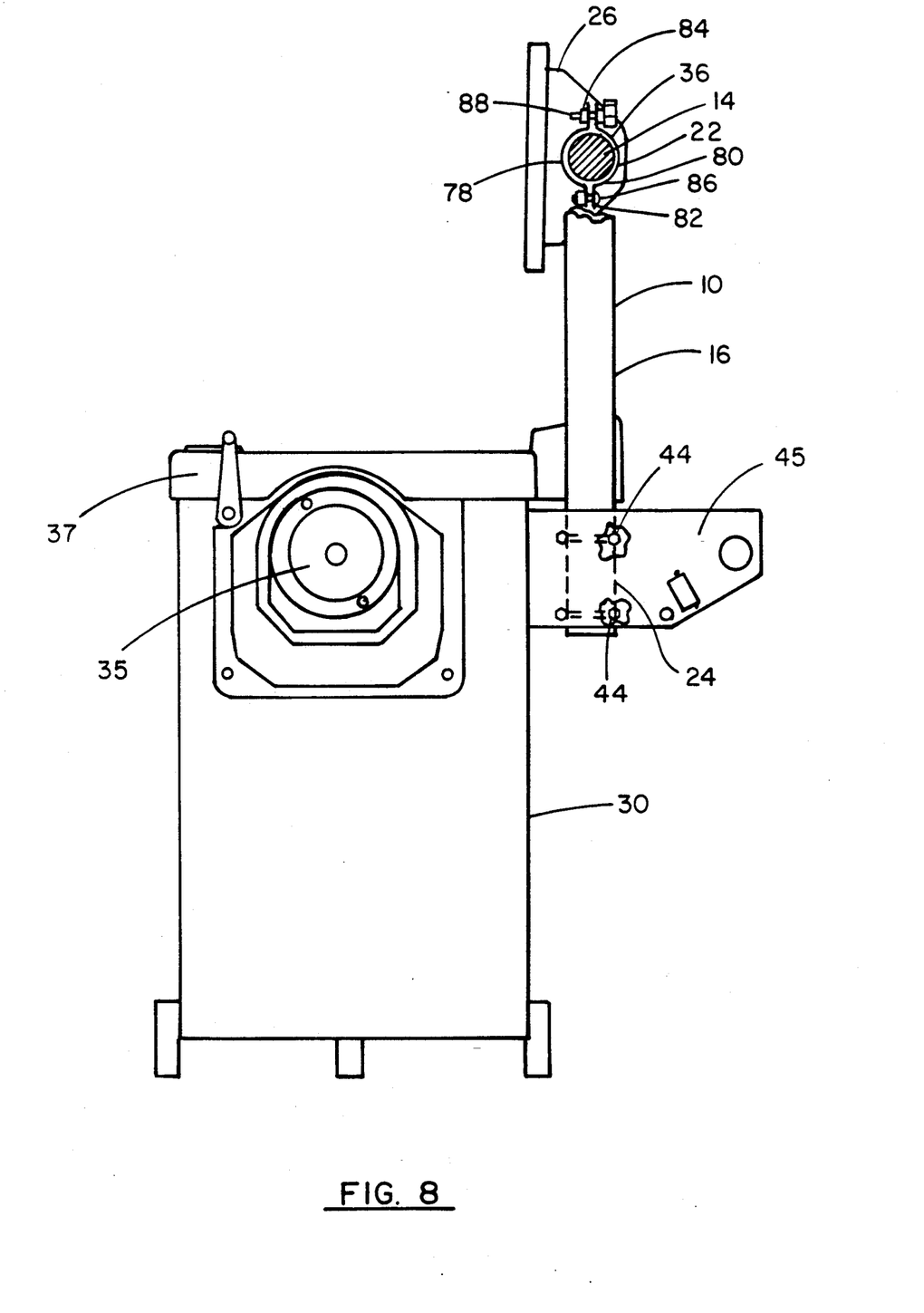
FIG. 8 is a cutaway side view of a preferred embodiment of the present invention.

Referring now specifically to FIGS. 7 and 8, a preferred embodiment of device 10 is shown. Pod bracket 22 includes front plate 78 and rear plate 80. Front plate 78 is attached to rear plate 80 below horizontal section 14 of pod support 12 by two conventional hex head bolt and nut assemblies 86 and inserted through lower holes 82 in plates 78 and 80. Above horizontal section 14 of pod support 14 plates 78 and 80 are secured by bolt and nut assemblies 88 through upper holes 84. Preferably, the nuts on assemblies 88 have large diameters, such as a wing nut, so that pod bracket 22. When bolt assemblies 88 are loosened, pod 26 can be rotated around horizontal section 14 in the vertical plane as shown on FIG. 3 or be moved along horizontal section 14 of support 12, as shown on FIG. 2.

Vertical section 16 of support 12 is mounted to a U-shaped frame 45 which extends from the rear of wheel balancer base 30. Base bracket 24, which includes plate 40, is positioned inside frame 45 as seen on FIG. 7. Vertical section 16 of support 12 is attached to plate 40 of bracket 24, and bracket 24 to frame 45, by two U-bolt assemblies 44. For easy manual adjustment, U-bolt assemblies 44 can include large nuts with handles, such as wing nuts. When U-bolts assemblies 44 are loosened, support 12 and pod 26 can be rotated in the horizontal plane, as shown in FIG. 4, or moved vertically along balancer 30 as shown in FIGS. 2 and 5.

Figure 3:
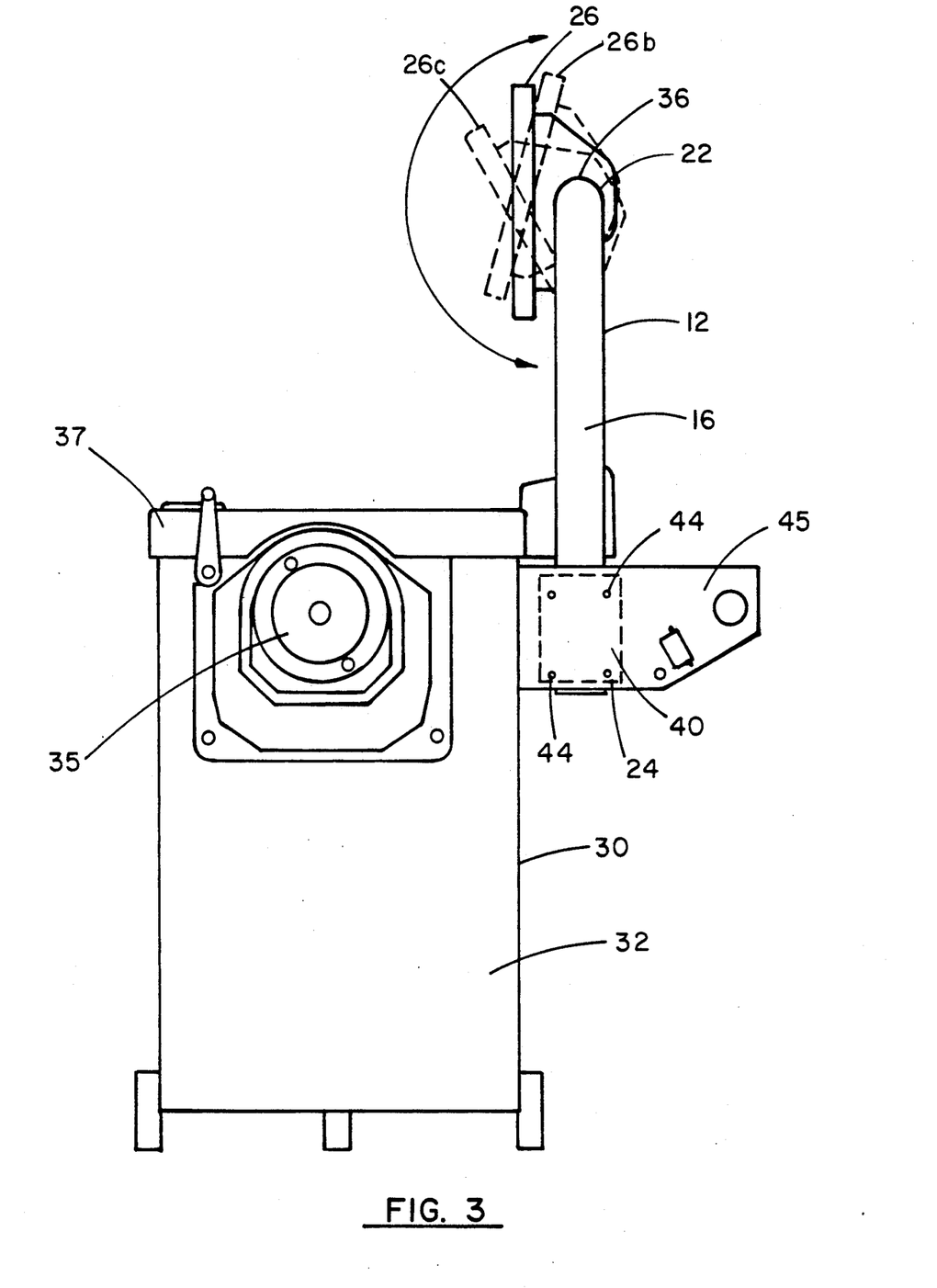
FIG. 3 is a side view of the present invention showing rotation in the vertical plane or tilting of the pod about the pod support.

Referring now to FIGS. 1 and 3 in conjunction, one can see how pod 26 rotates about support 12. As discussed above, pod bracket 22 is attached to the rear of pod 26. Passing through pod 26 is cylindrical chamber 36 which receives horizontal section 14 of support 12. Pod 26 therefore can tilt or rotate about horizontal section 14 to positions 26a and 26b for example.

Figure 4:
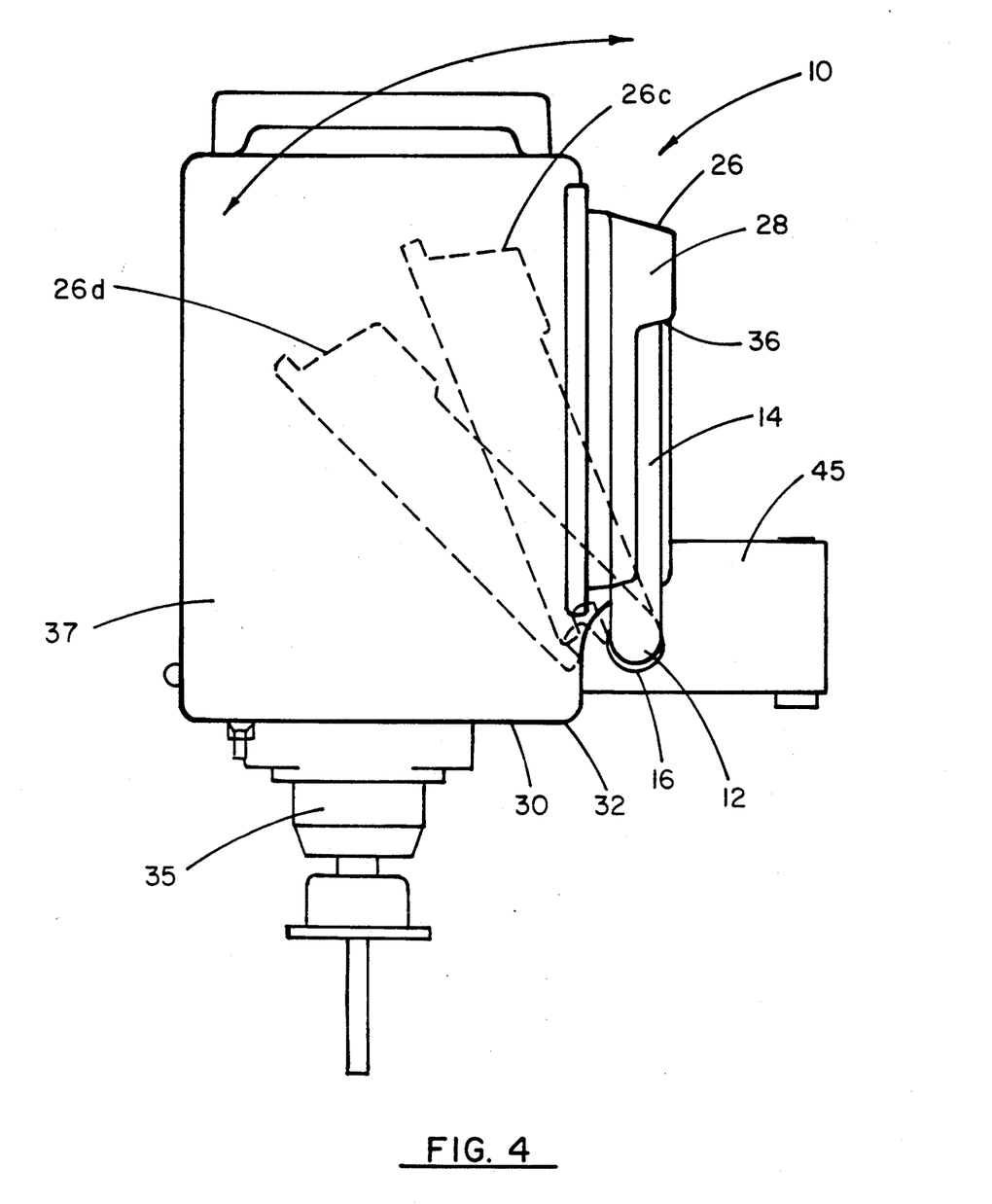
FIG. 4 is a top view showing in phantom rotation in the horizontal plane of the pod and pod support.

Referring now to FIGS. 1 and 4 in conjunction, one can see how device 10 allows pod 26 to rotate about base bracket 24 in the horizontal plane. As described above, base bracket 24 attaches to housing 32 of balancer 30 whereas pod 26 attaches to pod bracket 22 at pod housing 28. When base bracket 24 is loosened, vertical section 16 of support 12 can rotate about base bracket 24 such that pod 26 can be pivoted, for example, to positions 26c or 26d.

Figure 5:
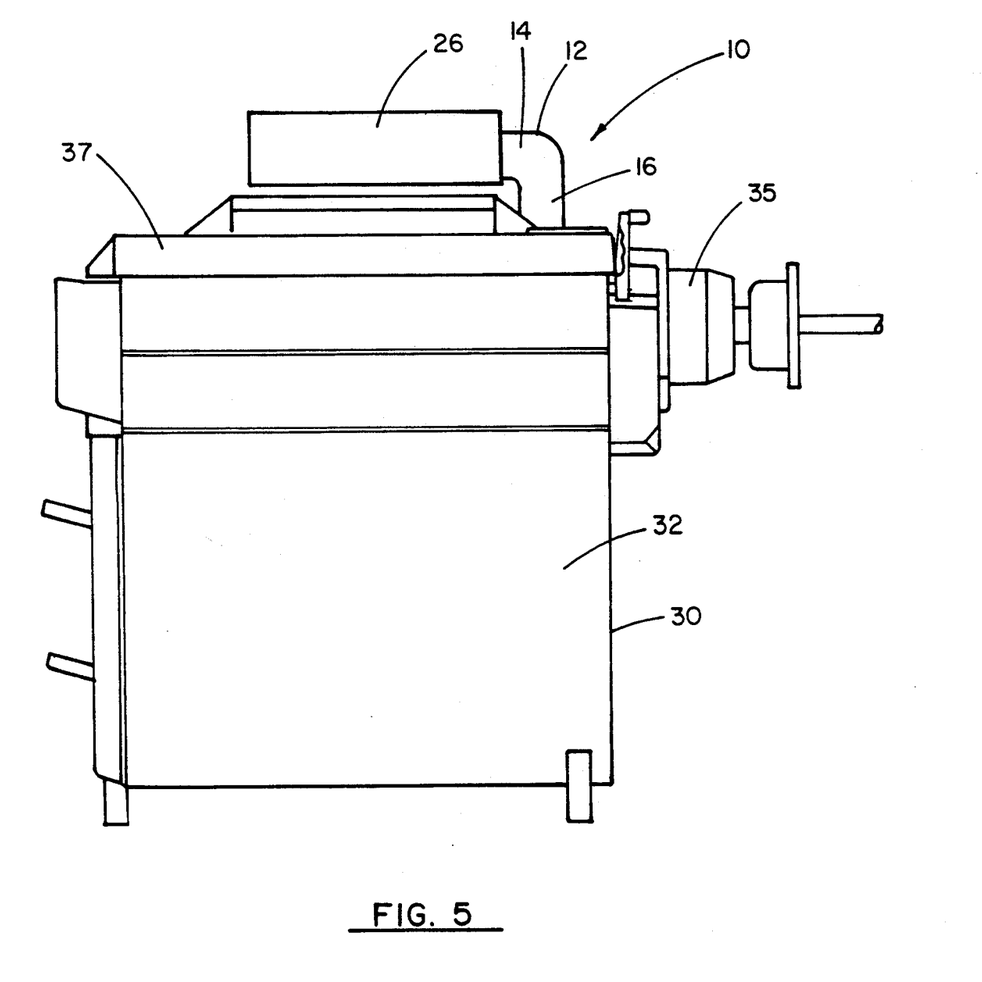
FIG. 5 is a front view of the present invention with the pod and pod support shown in a shipping or storage position.
Figure 6:
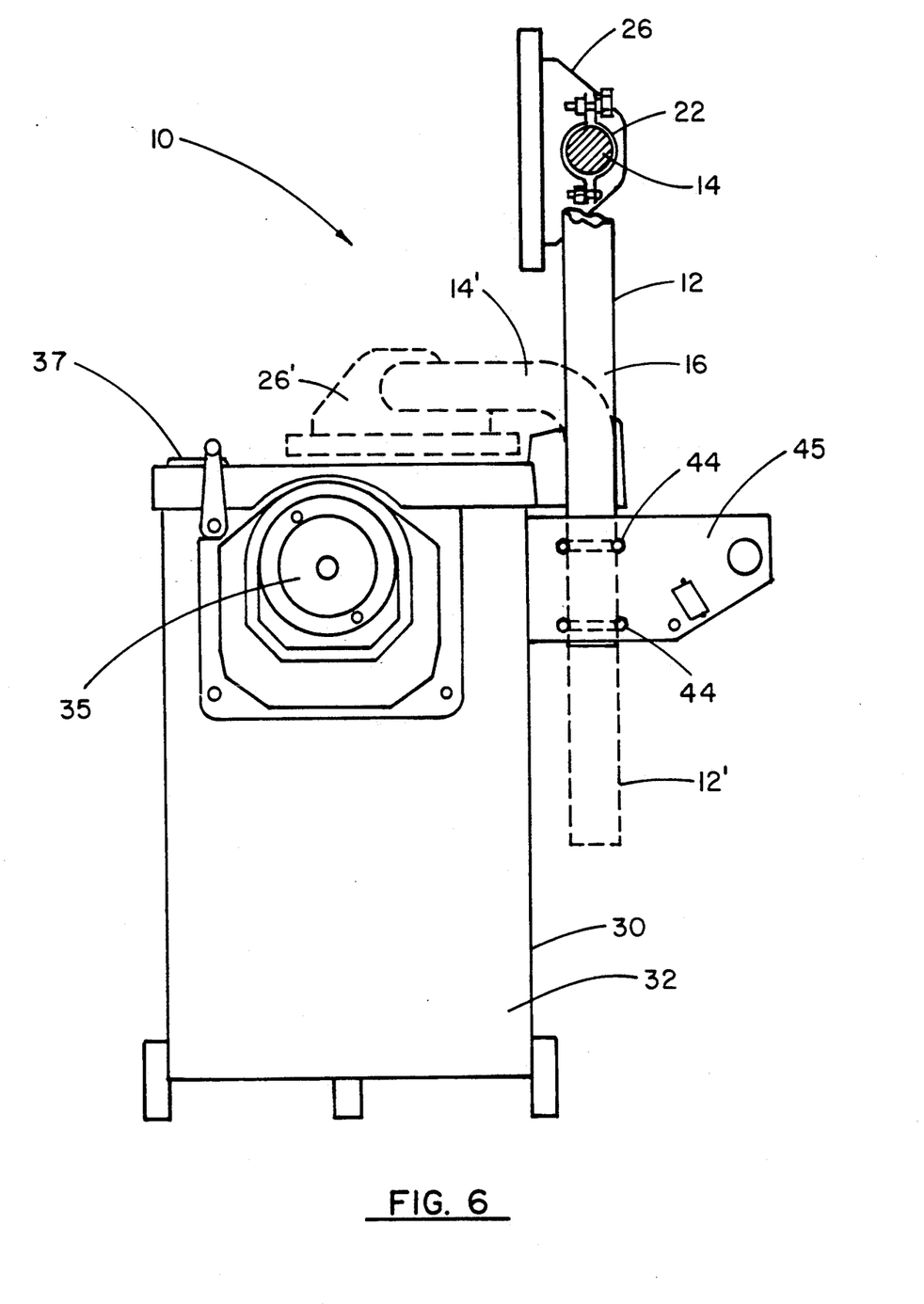
FIG. 6 is an end view of the present invention shown in a shipping position.

Referring now to FIGS. 5 and 6 there is shown generally front and side views of the invention attached to wheel balancer base 30 but with the machine configured for shipping or storage. Both pod bracket (22 in FIGS. 7 and 8) and base bracket (24 in FIGS. 7 and 8) have been loosened and pod 26 has been moved to its lowest profile and turned so that it is substantially flat. Pod 26 is in its position 26' closest to wheel balancer base 30. This is accomplished by lowering support 12 to position 12' and rotating support 12 so that horizontal section 14 assumes position 14'. Or, as shown on FIG. 5, horizontal section 14 can be left in a position parallel to the front of base unit 30.

It will be apparent to those skilled in the art that the means described for securing pod support 12 to pod bracket 22 and base bracket 24 are not exclusive, any other known structures for applying tension forces to support 12 can be used, as long as such structures can be alternatively tightened or loosened manually or by use of simple hand tools. Examples would include set screw bearing directly against pod support 12 and removable bolt assemblies passing directly through support 12.

Thus, although there have been described particular embodiments of the present invention of a new and useful device for attaching a pod to a wheel balancer, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What is claimed is:

1. An operator interface pod for use in conjunction with an electronic wheel balancer machine comprising:
   a. a pod support joining said pod to a wheel balancer base of said machine;
   b. bracket means attaching said pod support to said wheel balancer base, said base bracket means adapted for vertical adjustment of said pod above said base and for rotation of said pod and said pod support in a horizontal plane above said base; and
   c. bracket means attaching said pod to said pod support, said pod bracket means adapted for horizontal adjustment of said pod parallel to said base and for rotation of said pod around said support in a vertical plane.

2. The device of claim 1 wherein said pod support comprises a vertical section attached to said base and a horizontal section attached to said pod.

3. The device of claim 2 further comprising means for manually tensioning said pod and said pod bracket means to said support.

4. An electronic wheel balancer apparatus, including imbalance force transducers and means attached to a base unit to mount and rotate a wheel comprising:
   a. an operator pod;
   b. a support for said operator pod having a vertical and a horizontal section;
   c. base bracket means attaching said vertical section of said support to said base unit such that said support extends vertically above said base unit;

d. pod bracket means attaching said horizontal section of said support to said pod;

e. means attached to said base bracket means for manual sliding adjustment of said support and said pod above said base unit and for manual rotating adjustment of said support and said pod in the horizontal plane above said base unit; and f. means attached to said pod bracket means for manual sliding adjustment of said pod along said horizontal section of said support and for manual rotating adjustment of said pod in the vertical plane around said support.

5. An electronic wheel balancer comprising:

a. a base comprising a housing enclosing a drive motor and a weight tray attached to the top of said housing;

b. a wheel rotation and force imbalance transducer assembly attached to said base;

c. a keyboard and visual display pod for use by an operator of said balancer, said pod physically separated above said base;

d. means to tilt said pod toward and away from said weight tray to accommodate differing display viewing angles and to slide said pod horizontally in parallel to said weight tray; and e. means to move said pod vertically above said weight tray to accommodate differing keyboard operating positions and to rotate said pod horizontally above said base to accommodate differing display viewing and keyboard operating positions.

6. The balancer device of claim 5 wherein said means to tilt and to slide said pod horizontally comprise an adjustable bracket attaching said pod to a horizontal section of a support and wherein said means to rotate said pod horizontally and to vertically move said pod comprise an adjustable bracket attaching said support to said base.

7. The balancer of claim 6 wherein said means to vertically move and rotate said pod into said shipping position comprise said pod bracket and said base bracket.

* * * * *